Aug. 22, 1933.  T. A. MITCHELL  1,923,324
METHOD OF PRODUCING HYDROCHLORIC ACID GAS
Filed Oct. 28, 1930
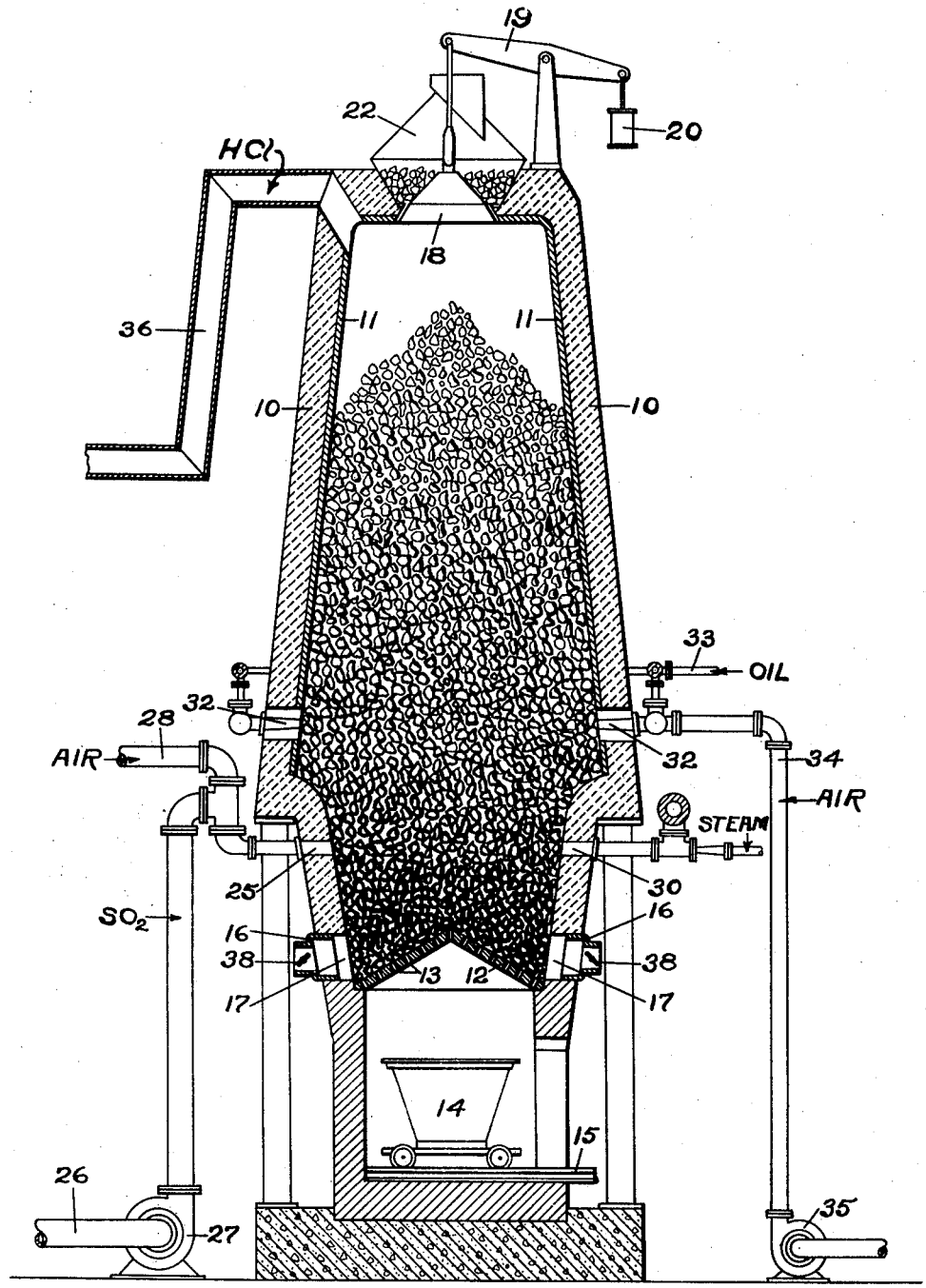
INVENTOR
THOMAS A. MITCHELL
BY
Clayton R. Jenks
ATTORNEY Patented Aug. 22, 1933

1,923,324

UNITED STATES PATENT OFFICE 1,923,324

METHOD OF PRODUCING HYDROCHLORIC ACID GAS

Thomas A. Mitchell, Denver, Colo., assignor to Lafayette M. Hughes, Denver, Colo.

Application October 28, 1930. Serial No. 491,743

4 Claims. (Cl. 23—154)

This invention relates to a method of producing hydrochloric acid gas.

In accordance with a process developed by Hargreaves and later workers in the field, hydrochloric acid gas is produced by passing sulfur dioxide gas, air and steam over sodium chloride, thereby forming sodium sulfate and hydrochloric acid gas. One method of carrying out the Hargreaves process involves passing briquettes of sodium chloride downwardly through a vertical chamber or tower while passing the sulfur dioxide with air and steam upwardly through this descending mass of material. Salt briquettes, however, have no great strength, and as the action goes on there is a large tendency for the material to form into a mass which is not easily permeated by the gases. This creates a problem in this manufacturing operation and makes it difficult to obtain a satisfactory yield. Moreover, if the hydrochloric acid gas is to be manufactured and used in a cycle of operations which do not involve the use of a sodium salt, then the process may not be economically feasible.

Owing to its plentiful occurrence in nature, calcium carbonate is a common reagent in chemical fields and its chlorine derivative is often obtained as an undesired and commercially valueless end product in various chemical reactions. In the course of my experimentation with calcium chloride, I have discovered that it may be advantageously employed in place of sodium chloride in such a process, and that various disadvantages inherent in the prior process are overcome if the calcium chloride has been previously dehydrated and fused, and then employed in a lump form. When calcium chloride is converted to a sulfate in the presence of water vapor, the material hydrates and forms gypsum. This product is hard and has considerable strength and so offers resistance to crushing strains; and in this particular property lies an important advantage in the use of calcium chloride as a reagent for the production of hydrochloric acid gas.

If lumps of dehydrated, prefused calcium chloride are used for the chlorine supplying reagent, there is formed a layer of calcium sulfate on each lump as it descends through the tower and this calcium sulfate hydrates to a hard and strong layer. In that way, the lumps are strengthened against the crushing force arising from the large weight of the column of calcium chloride above the converted material. Thus the pores and spaces between the lumps of calcium chloride are maintained from the top of the tower to the bottom and it is easy to pass the gaseous reagent upwardly through this material.

It will now be apparent in view of the above statements that the primary objects of this invention are to utilize a cheap and easily obtainable material, and one which is frequently an undesired end product in various chemical reactions, which will be an efficient chlorine supplying reagent for producing hydrochloric acid gas, and particularly to utilize calcium chloride in such a form that when used in a continuous counterflow process in a vertical chamber, the resultant product will be capable of resisting the crushing action of the column of material and thereby insure that the mass will remain porous and open and be easily permeated by the reagent gases.

With these and other objects in view as will be apparent to one skilled in the art, my invention resides in the combination of steps in the process set forth in the specification and covered by the claims appended hereto.

This invention comprises the steps of causing calcium chloride to react with sulfur dioxide gas, oxygen, and water vapor at a temperature suitable for the formation of hydrochloric acid gas and calcium sulfate. The gaseous product is conducted from the chamber to suitable receiving apparatus, such as purifiers, storage tanks or other reaction apparatus as is required, and the calcium sulfate formed in the reaction is removed either continuously or intermittently as required for effectively carrying on the process.

The calcium chloride is preferably employed in a dehydrated, prefused lump form and of such a size that the gases may easily permeate the mass, and in order to obtain this form, a calcium chloride solution may be evaporated and the product dried, fused, cooled and then broken into lumps. The reaction may be carried on in a vertical chamber or tower in which the lumps of calcium chloride are fed into the top of the chamber and sulfur dioxide gas, air and steam are blown into the bottom of the chamber and caused to pass in counterflow relation through the descending material, heat being supplied from an external source. The residue of calcium sulfate or gypsum may be removed intermittently or continuously from the bottom of the chamber.

Referring now to the drawing, I have there shown one form of apparatus in which this process may be carried on, the figure being a vertical elevation through the reaction chamber with some parts shown diagrammatically.

The reaction may be carried on in a furnace or tower-like structure comprising walls 10 made of suitable refractory material which are lined with an acid-proof lining 11 as is understood by those skilled in the art. This furnace or tower is adapted to hold a large quantity of lumps of pre-fused calcium chloride which will serve as a chlorine supplying medium for the reaction. To this end, the bottom of the tower is constructed as a grate 12 provided with small perforations 13 through which the fines of the reaction product may escape into suitable apparatus, such as the car 14 mounted on rails 15 beneath the tower. For the purpose of removing large lumps from the tower, doors 16 are slidably fitted within openings 17 in the side of the structure whereby these lumps may be raked out through the openings and removed as desired.

The calcium chloride lumps may be supplied to the top of the tower by means of a suitable feeding device, and this may comprise a bell 18 mounted on one end of a walking beam 19 and moved by a suitable power operated device 20. The hopper 22 above the bell is designed to carry a charge of the calcium chloride lumps which may be introduced into the chamber when desired. This bell and hopper construction may be suitably constructed to permit charging the reagent into the tower without permitting the escape of gases therefrom, as is understood by those skilled in the art.

Sulfur dioxide gas and air are admitted into the furnace through a row of tuyères 25 arranged around the furnace and projecting inwardly into the lower end of the chamber. The sulfur dioxide is supplied from any suitable source through the pipes 26 and the driving fan chamber 27 and is admixed with air entering through the pipe 28 before entering the tuyères 25. Steam is admitted through other tuyères 30 which are interspersed with the tuyères 25.

For the purpose of heating the mass and of aiding in the control of the temperature, an oil flame or other suitable source of heat is provided. As illustrated, fuel oil may be fed to the burners 32 through suitable atomizing devices from the pipe line 33, where it is admixed with air entering through the pipe line 34 from the blower 35. The hydrochloric acid gas formed by the reaction of the various materials issues from the top of the furnace through pipe 36 and may be conducted to any suitable apparatus for use, or storage. Air openings are provided at the bottom of the furnace for admitting air to cool the resulting product. These may be the same as the openings 17 and they may be regulated by means of suitable dampers 38 arranged in the doors 16.

It will now be understood that the process may be carried on continuously or intermittently. Large sized lumps of calcium chloride are introduced into the top of the furnace to substantially fill the same, as illustrated in the drawing, and a mixture of air, sulfur dioxide gas and steam is passed into the lower end of the furnace in suitable proportions for the reaction. At the same time the oil burners deliver heat to the material. It is preferred that the temperature range from 600° F. to 1000° F. in the zone just over the oil flame and it may register about 300° F. at the exit to the pipe 36. The range of temperature will depend upon various conditions, such as the temperature of the sulfur dioxide gas entering the reaction chamber, which in turn depends upon the source and distance of the supply of the material and the nature of the treatment used for purifying it. It is preferred to utilize a temperature higher than is needed for the reaction between the sulfur dioxide and air to form sulfur trioxide, in order to speed up the decomposition of the calcium chloride.

As above explained, it is preferable to employ lumps of calcium chloride, and these may be obtained by evaporating a solution thereof and drying the product to remove any water therefrom. It is then fused in a suitable apparatus and poured onto a cement flooring and there permitted to cool, after which the cake of calcium chloride is broken into lumps of a desired size. The reaction between the sulfur trioxide and the calcium chloride takes place at the surface of the lump and in the presence of water vapor. An excess of water vapor is provided to insure that the calcium sulfate thus formed will be hydrated to form gypsum. This material is comparatively strong and hard and it will hold up the shape of the lump and resist the crushing forces involved in the weight of the column of material above. As this combination lump of calcium chloride and calcium sulfate descends towards the bottom of the reaction chamber it will become gradually converted to calcium sulfate. The calcium chloride is readily attacked and the reaction proceeds efficiently because the material does not settle into a mass of fine particles or one which is not easily permeated by the gases. The gases will pass readily upwardly through this descending column of material and have complete access to the surfaces of the lumps.

It is to be understood that barium chloride may be employed instead of calcium chloride in this process, and particularly if barium sulfate is desired as an end product; hence the claims are to be interpreted as covering both barium and calcium chlorides as the source of chlorine for the reaction.

Having thus described my invention, what I claim as new and desire to secure by Letters Patent is:

1. The method of making hydrochloric acid gas comprising the steps of causing lumps of pre-fused calcium chloride to react with sulfur dioxide, and, and water vapor, while maintaining temperature conditions required to cause the formation of said gas, and providing an excess of water vapor to convert the calcium sulfate to gypsum which strengthens the lumps and prevents the material from packing into a body which is difficultly permeable to the reagent gases.

2. The method of making hydrochloric acid gas and gypsum comprising the steps of charging lumps of pre-fused calcium chloride into a tower and forming a substantially stationary self-supporting body thereof, removing material from the bottom of the tower and thus moving the body downwardly, passing sulful dioxide, air, and steam in counterflow relation to said body, while maintaining temperature conditions required for the formation of hydrochloric acid gas, and providing an excess of water vapor to hydrate the calcium sulfate and cause it to form a coating of gypsum on the lumps which will resist the crushing action of the weight of the column and thereby maintain a porous mass through which the reagent gases may pass easily.

3. The method of making hydrochloric acid gas comprising the steps of charging dehydrated pre-fused lumps of calcium chloride into the top of a reaction chamber and providing a self-supporting substantially stationary body of said lumps, passing sulfur dioxide, air, and steam into the lower portion of said body, heating the lower end of the reaction chamber and maintaining temperature conditions required for producing hydrochloric acid gas and calcium sulfate, removing the gas from the upper portion of the chamber and maintaining an excess of steam present to insure that the calcium sulfate is completely hydrated and thereby strengthening the lumps so as to resist the crushing action of the weight of the body.

4. The method of making hydrochloric acid comprising the steps of providing dehydrated and pre-fused calcium chloride in lump form, passing the pre-fused lumps thorough a reaction chamber while adding fresh material at one end and removing the reaction product at the other, causing a current of suitably proportioned sulfur dioxide, steam and air to flow through the reaction chamber over the calcium chloride, heating the material to a temperature required for producing hydrochloric acid therefrom, and providing an excess of steam to insure that the calcium sulfate formed on the surfaces of the lumps is completely hydrated, so that the calcium chloride will be maintained as a body of separated lumps which is easily permeated by the gaseous reagents.

THOMAS A. MITCHELL.

CERTIFICATE OF CORRECTION.

Patent No. 1,923,324. August 22, 1933.

THOMAS A. MITCHELL.

It is hereby certified that error appears in the printed specification of the above numbered patent requiring correction as follows: Page 2, line 121, claim 1, for "and, and" read air and; and line 134, claim 2, for "sulful" read sulfur; and that the said Letters Patent should be read with these corrections therein that the same may conform to the record of the case in the Patent Office.

Signed and sealed this 21st day of November, A. D. 1933.

F. M. Hopkins
(Seal) Acting Commissioner of Patents.